United States Patent
Gerrie (10) Patent No.: US 12,462,001 B2
(45) Date of Patent: Nov. 4, 2025

(54) DIGITAL WATERMARKING IN A CONTENT DELIVERY NETWORK

(71) Applicant: Sky CP Limited, Middlesex (GB)

(72) Inventor: Andrew Gerrie, Middlesex (GB)

(73) Assignee: Sky CP Limited, Middlesex (GB)

( * ) Notice: Subject to any disclaimer, the term of this patent is extended or adjusted under 35 U.S.C. 154(b) by 292 days.

(21) Appl. No.: 17/916,465

(22) PCT Filed: Mar. 29, 2021

(86) PCT No.: PCT/GB2021/050776
§ 371 (c)(1),
(2) Date: Sep. 30, 2022

(87) PCT Pub. No.: WO2021/198669
PCT Pub. Date: Oct. 7, 2021

(65) Prior Publication Data
US 2023/0141582 A1    May 11, 2023

(30) Foreign Application Priority Data
Apr. 3, 2020   (GB) ..................... 2004941

(51) Int. Cl.
*G06F 21/16*   (2013.01)
*G06F 21/60*   (2013.01)
*H04N 21/2187*   (2011.01)
*H04N 21/2347*   (2011.01)
*H04N 21/8358*   (2011.01)
*G06F 21/10*   (2013.01)

(52) U.S. Cl.
CPC ............ *G06F 21/16* (2013.01); *G06F 21/602* (2013.01); *H04N 21/2187* (2013.01); *H04N 21/23476* (2013.01); *H04N 21/8358* (2013.01); *G06F 21/1063* (2023.08)

(58) Field of Classification Search
CPC .... G06F 21/16; G06F 21/602; G06F 21/1063; H04N 21/2187; H04N 21/8358; H04N 21/23476
USPC .......................................................... 726/26
See application file for complete search history.

(56) References Cited

U.S. PATENT DOCUMENTS

| 5,664,018 A | 9/1997 | Leighton |
| 8,165,343 B1 | 4/2012 | McGowan |

(Continued)

OTHER PUBLICATIONS

NPL Search Terms (Year: 2025).*

(Continued)

*Primary Examiner* — Syed A Zaidi
(74) *Attorney, Agent, or Firm* — McCarter & English, LLP (57) ABSTRACT

Systems and methods for digital watermarking at a content distribution network, CDN, node are described, whereby source data intended for at least one recipient is received from an origin server, the source data including a plurality of encrypted segments interleaved with at least one non-encrypted segment. Metadata is detected in the source data, the metadata identifying each non-encrypted segment, and in response, the source data is modified for each recipient, by embedding a recipient-specific digital watermark to at least a portion of a non-encrypted segment in the source data. The modified source data is then transmitted to each respective recipient. Other embodiments are also described and claimed.

15 Claims, 5 Drawing Sheets

(56) References Cited

U.S. PATENT DOCUMENTS

| | | |
|---|---|---|
| 9,058,645 B1 | 6/2015 | Corley et al. |
| 9,547,753 B2 | 1/2017 | Petrovic et al. |
| 2002/0106192 A1 | 8/2002 | Sako |
| 2005/0193205 A1* | 9/2005 | Jacobs .................. H04L 63/126 713/176 |
| 2007/0277039 A1* | 11/2007 | Zhao ................ G11B 20/00086 375/E7.17 |
| 2008/0165958 A1* | 7/2008 | Matsushita ............. G06F 21/10 380/44 |
| 2010/0100742 A1* | 4/2010 | Courington ........ H04N 21/8358 713/176 |
| 2011/0261997 A1 | 10/2011 | Lee et al. |
| 2014/0304507 A1 | 10/2014 | Coppola et al. |
| 2015/0016663 A1* | 1/2015 | Tehranchi .......... H04N 1/32272 382/100 |
| 2016/0070655 A1* | 3/2016 | Joshi ....................... G06F 21/85 713/193 |
| 2016/0323351 A1* | 11/2016 | Luthra ................ H04L 63/0428 |
| 2017/0334234 A1* | 11/2017 | Curtis .................. B42D 25/333 |
| 2020/0014988 A1* | 1/2020 | Navali ................ H04N 21/437 |

OTHER PUBLICATIONS

International Search Report and Written Opinion dated Jun. 23, 2021, issued in connection with International App. No. PCT/GB2021/050776 (8 pages).
Combined Search and Examination Report dated Dec. 16, 2020, issued in connection with UK App. No. GB2004941.7 (5 pages).
Examination Report dated Apr. 28, 2022, issued in connection with UK App. No. GB2004941.7 (5 pages).
Sandeep Singh, "Watermarking: A Content Owner's Mark to Prevent Piracy," The Akamai Blog, Oct. 11, 2019, webpage archived on Apr. 12, 2020: https://web.archive.org/web/20200412211204/https:/blogs.akamai.com/2019/10/watermarking-a-content-owners-mark-to-prevent-piracy.html (8 pages).

* cited by examiner

DIGITAL WATERMARKING IN A CONTENT DELIVERY NETWORK

RELATED APPLICATIONS

The present application is a U.S. National Phase Application under 35 U.S.C. § 371 of International Application No. PCT/GB2021/050776 filed on Mar. 29, 2021, which claims the benefit of United Kingdom Patent Application No. GB2004941.7 filed on Apr. 3, 2020, the entire disclosures of which are expressly incorporated by reference herein.

FIELD OF THE INVENTION

This invention relates generally to content delivery systems, and more particularly to techniques for delivery of digitally protected content in a distributed network.

BACKGROUND

Content delivery systems are generally known, in which content delivery networks (CDNs) are used to provide a content delivery service on behalf of content providers. CDNs are typically a geographically distributed network of proxy servers to provide high availability and high performance in the delivery of content such as audio, video or image data. Typically, edge servers (or nodes) are distributed throughout the Internet, for example to efficiently transmit cached content to local end user devices.

As CDNs typically serve content to substantial numbers of requesting end-user devices, content originators typically seek to implement schemes to protect the content distributed through the CDNs. Digital Rights Management (DRM) refers to the technology used for the protection of digital media content. DRM works by encrypting the content before distribution, and by limiting access to only those end-users who have acquired a proper license to play the content. Digital watermarking refers to techniques for covertly embedded or hiding digital information in the noise-tolerant content carrier signal. Digital watermarks may be used to verify the authenticity or integrity of the carrier signal or to show the identity of its owners and/or intended recipients, useful information to ascertain and fix issues if a CDN is compromised. Furthermore, a digital watermark on the content allows an entity to track back to the original source of a leak, for example where bad actors resell or "pirate" legitimately paid for content, through their own networks to a own set of end users, meaning lost revenue for a media provider.

There is an on-going need for improved security and protection against the wide array of varied malicious and fraudulent attacks. The present invention aims to address these and other related issues with improved computational efficiency and scalability.

SUMMARY OF THE INVENTION

Aspects of the present invention are set out in the accompanying claims.

According to one aspect, there is described a method of digital watermarking at a content distribution network, CDN, node, the method comprising receiving, from an origin server, source data intended for at least one recipient, the source data including a plurality of encrypted segments interleaved with at least one non-encrypted segment; detecting metadata in the source data, the metadata identifying the, or each, non-encrypted segment; in response to detecting metadata identifying a non-encrypted segment, modifying the source data for the, or each, recipient, by embedding a recipient-specific digital watermark to at least a portion of a non-encrypted segment in the source data; and transmitting the modified source data to the, or each respective, recipient.

The recipient-specific digital watermark may be embedded to at least a portion of each non-encrypted segment in the source data.

The recipient-specific digital watermark may be embedded to one or more randomly determined portions within a non-encrypted segment. The recipient-specific digital watermark is embedded to a portion of the non-encrypted segment at a random offset from the start of the non-encrypted segment.

The source data may comprise an encoded data stream of on-demand or live media content.

The encoded data stream may include metadata identifying a non-encrypted segment that is added when the origin server creates a non-encrypted segment. The origin server may create a non-encrypted segment in response to determined occurrence of an event associated with the source data.

The, or each, non-encrypted segment may be a predetermined length or size.

The encrypted segments may comprise source data that is encrypted for digital rights management.

The CDN node may be an edge server in a distributed network. The received source data may be stored in a cache memory of the CDN node, and the recipient-specific digital watermark may be embedded to a non-encrypted segment of the source data retrieved from the cache memory.

The recipient-specific digital watermark may comprise information that is unique to a device of the, or each, intended recipient.

According to another aspect, there is described a server for distributing media content, the server comprising one or more processors configured to generate a content data stream including a plurality of DRM-protected segments interleaved with DRM-free segments, and to transmit the content data stream to a content distribution network, CDN, for digital watermarking of the content data in the DRM-free segments.

The server may be further configured to create a DRM-free segment in response to determining occurrence of an event associated with the content data stream. Occurrence of an event may be determined based on at least one parameter defining a proportion of the encoded data stream to be digitally watermarked. Occurrence of an event may be determined based on user input identifying the associated event.

In another aspect, there is described a method of digital watermarking at a content distribution network, CDN, node, the method comprising receiving content data from a server, the content data including at least one breakout flag associated with a respective portion of the content data, detecting a breakout flag in the received content data and in response, applying a digital watermark to the associated portion of received content data, and transmitting the content data including the watermarked portion to a receiver. The breakout flag may be associated with a portion of content data that is not encrypted.

In other aspects, there are described apparatus and systems configured to perform the methods as described above. In a further aspect, a computer program is described, comprising machine readable instructions arranged to cause a programmable device to carry out the described methods.

BRIEF DESCRIPTION OF THE DRAWINGS

There now follows, by way of example only, a detailed description of embodiments of the present invention, with references to the figures identified below.

DESCRIPTION OF EMBODIMENTS

Figure 1:
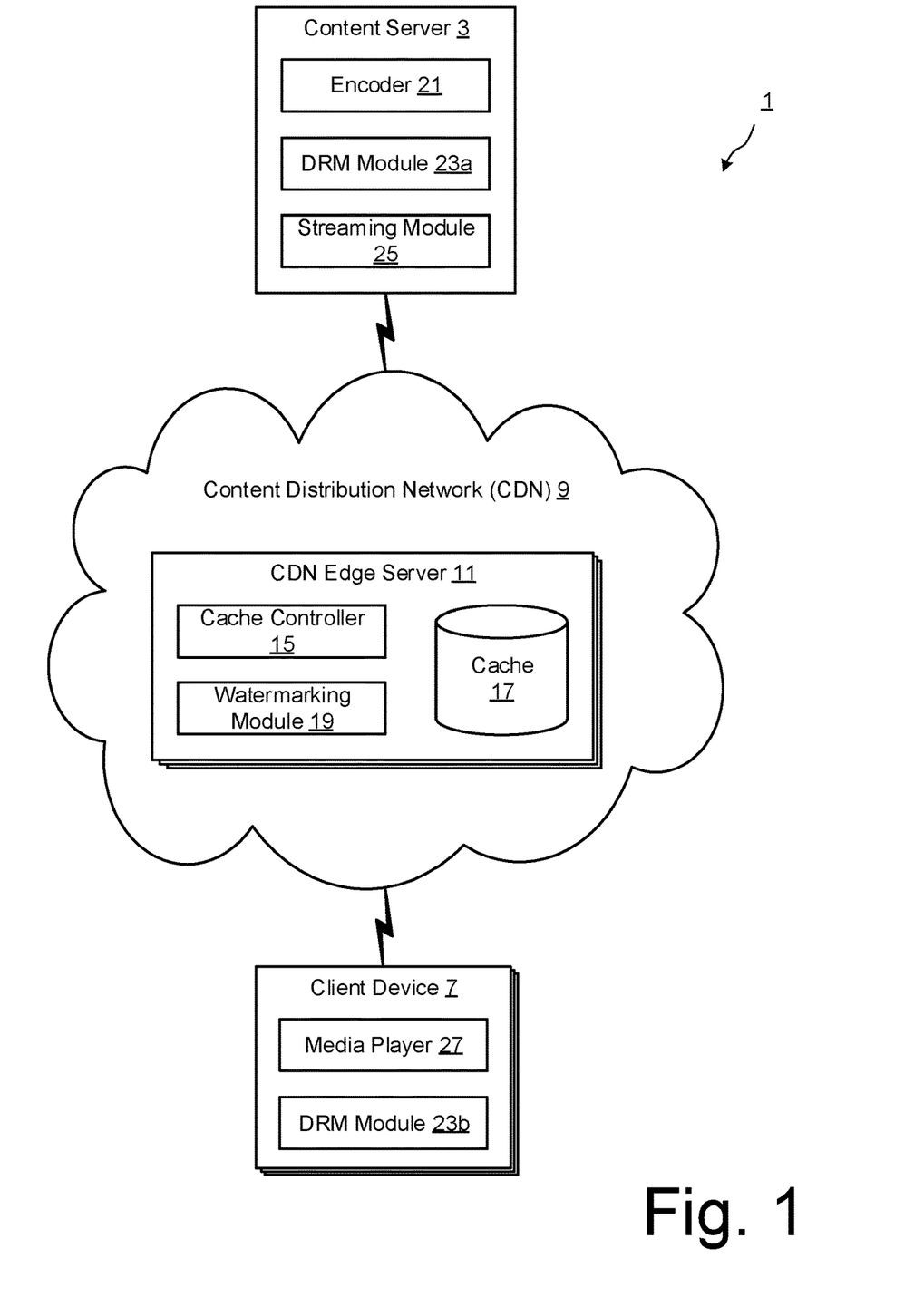
FIG. 1 is a block diagram showing the main components of a content delivery system according to embodiments of the invention.

FIG. 1 schematically illustrates an exemplary content delivery system 1 in which embodiments described herein may be implemented for efficient application of recipient-specific digital watermarking to assets with DRM protection. As shown, the system 1 includes a content server 3 for providing content data to one or more client (or end-user) devices 7 via computing nodes of a content distribution network (CDN) 9. The content server 3 may be one of a plurality of origin servers of a content originator or broadcaster, for example. The content server 3 may offload delivery of data to a plurality of distributed edge servers 11 of the CDN 9 (also referred to as edge nodes or points of presence). In the present embodiments, the content server 3 is configured to apply DRM protection to an encoded data stream of on-demand and/or live media content, interleaved with segments or portions of DRM-free (also referred to as non-DRM or non-encrypted) content data that are to be subjected to digital watermarking by the CDN edge servers 11. Interleaving of the DRM-free content segments may be determined by the content server 3, for example based on a defined set of associated events and/or a defined threshold proportion of transmitted media content to be digitally watermarked.

As known in the art, the CDN edge servers 11 are typically located at respective strategic geographic locations, serving as computing nodes at or near respective edges of the Internet to minimise the physical distance between any given client device 7 and CDN assets. Client devices 7 that desire the content 5 may be directed, for example by a Domain Name Server (DNS) or any other form of request-handling mechanism, to the closest CDN edge server 11 to obtain the content data 5. The CDN 9 may implement a distribution infrastructure including on-demand or push-based mechanisms to distribute content from the content servers 3 to CDN edge servers 11, typically over multiple Internet backbones. In this way, latency between the client devices 7 and the CDN 9 and/or the content server 3 is reduced. Furthermore, frequently accessed content may be cached by a cache controller 15 of the CDN edge server 11 in a cache memory 17, to further improve delivery efficiency of subsequent requests for the same content.

Each CDN edge server 11 is configured with a watermarking module 19 to apply digital watermarking to a determined portion of the interleaved segments of a received media stream that are determined to be DRM-free. Alternatively, the watermarking module 19 may be configured to implement recipient-specific watermarking functionality provided by one or more watermarking servers (not shown) of the CDN 9 through an application programming interface (API). Preferably, the watermarking module 19 applies digital watermarking that is specific to the intended recipient of the content data, such as the requesting end-user and/or client device 7. For example, digital watermarking may embed information about the client device 7 into the DRM-free segment of media content based on a defined embedding (digital watermarking) algorithm. The watermarking module 19 may be configured to control the application of digital watermarking by the CDN edge node 11, for example based on associated metadata received with the media content data.

The content server 3 includes a media encoder 21 to encode source data into an encoded data stream for distribution to the client devices 7 via the CDN network 9, using a streaming module 25. The media encoder 21 may use a DRM module 23a to encrypt the DRM-protected portions of a media file or stream, using a secret key. For example, the encoder 21 may be configured to encrypt DRM-protected portions of media content on the fly, using the DRM module 23a. Alternatively or additionally, media content assets may be stored in memory after pre-processing to encrypt the DRM-protected portions using the DRM module 23a, prior to transmission by the streaming module 25 to a requesting client device 7 (or CDN node). The DRM module 23a may encrypt source data using various DRM methods known in the art. As will be described in greater detail below, the encoder 21 is configured to insert metadata 47 into the encoded data stream to define and identify each DRM-free data segment that is subsequently digitally watermarked by a CDN edge server 11.

The streaming module 25 of the content server 3 may be configured to transmit the encoded data stream, including the DRM-protected segments of encrypted content data interleaved with DRM-free data segments, to a media player 27 of the client device 7 via the CDN 9. The encoded data stream may be transmitted as a plurality of data packets, as is well-known in the art. When an end-user attempts to play the received content stream including DRM-protected data segments, the media player 27 first checks for a corresponding license (which includes the secret key), before playback starts by decrypting the received DRM-protected data segments using a DRM module 13b. The media player 27 may be configured to request and obtain the license, from a license server (not shown) for example, to decrypt and play the DRM-protected segments of the encoded data stream. The media player 27 may also be configured to determine, from the received metadata 47, when particular segments of the encoded data stream are DRM-free and therefore playable without decryption. Advantageously, at least a portion of the DRM-free segments will be digitally watermarked by the CDN edge server 11 prior to receipt by the client device 7.

The client devices 7 may be any electronic devices suitable for outputting media content, such as a mobile/cellular 'smart' telephone, desktop computer, laptop computer, notepad/tablet computer, personal digital assistant (PDA), set-top box (STB), television, or the like. The client device 5 may have media player software to request, receive and display content received from the content server 3 via the CDN 7.

It should be appreciated that the CDN 9, the content server 3, and the client devices 7 may each include other components, sub-components, modules, and devices commonly found in respective components of the system 1, which are not illustrated in FIG. 1 for clarity of the description.

Figure 2:
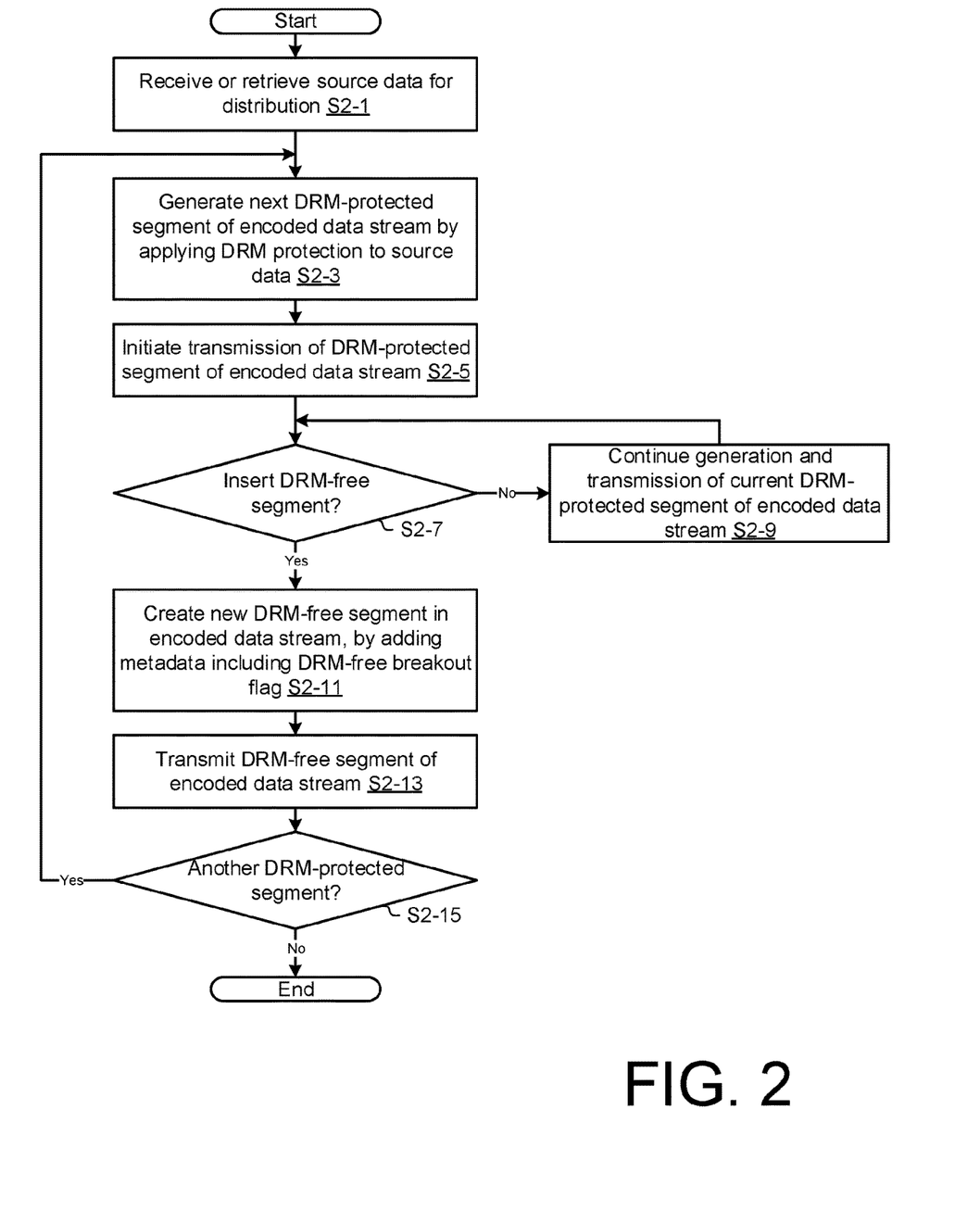
FIG. 2 is a flow diagram illustrating exemplary processing steps performed by a content server of the system of FIG. 1 to interleave DRM-free segments with DRM-protected content data, according to an embodiment.
Figure 3:
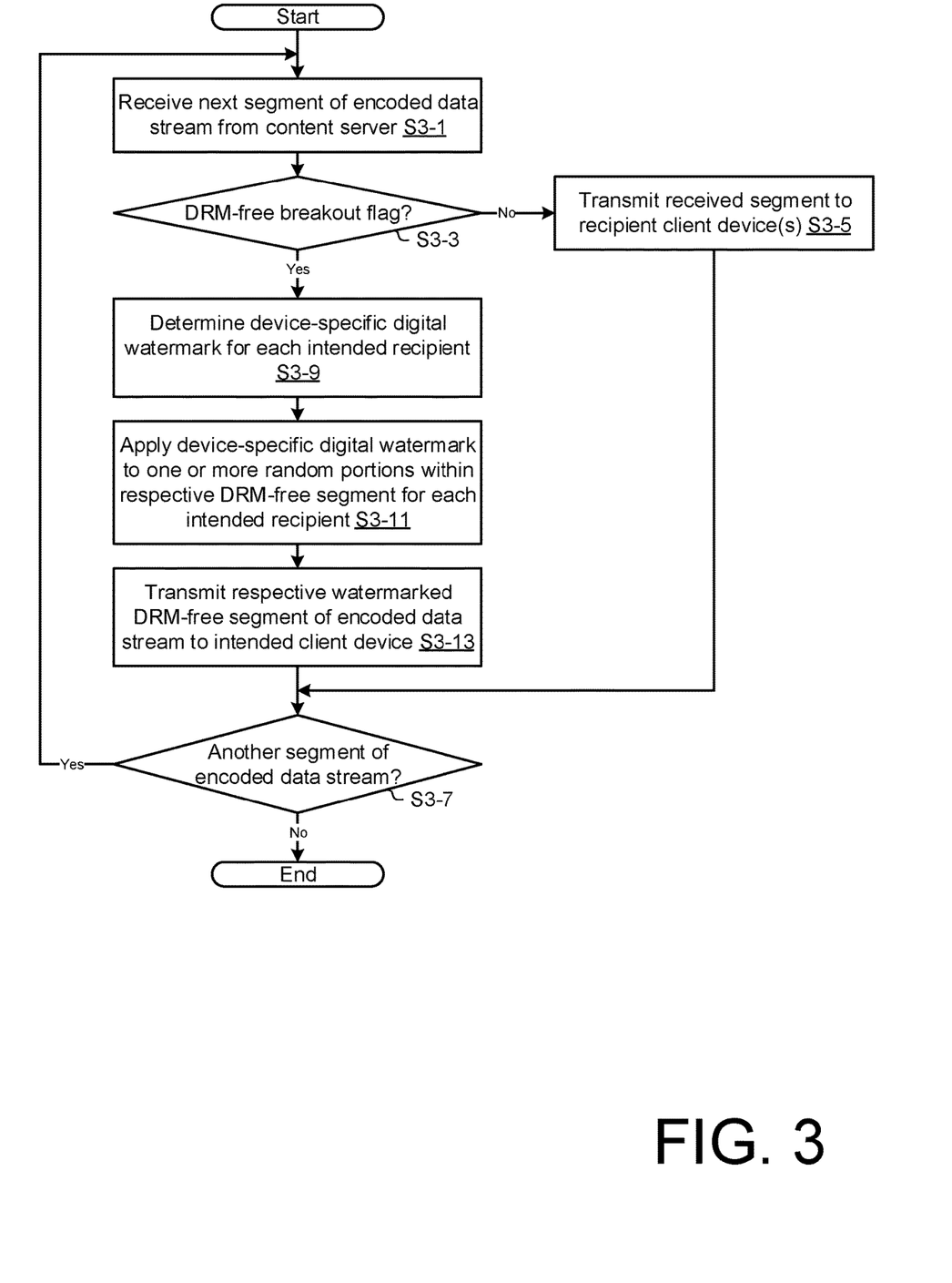
FIG. 3 is a flow diagram illustrating exemplary processing steps performed by a CDN edge server of FIG. 1 to determine and apply recipient-specific digital watermarking, according to an embodiment.
Figure 4:
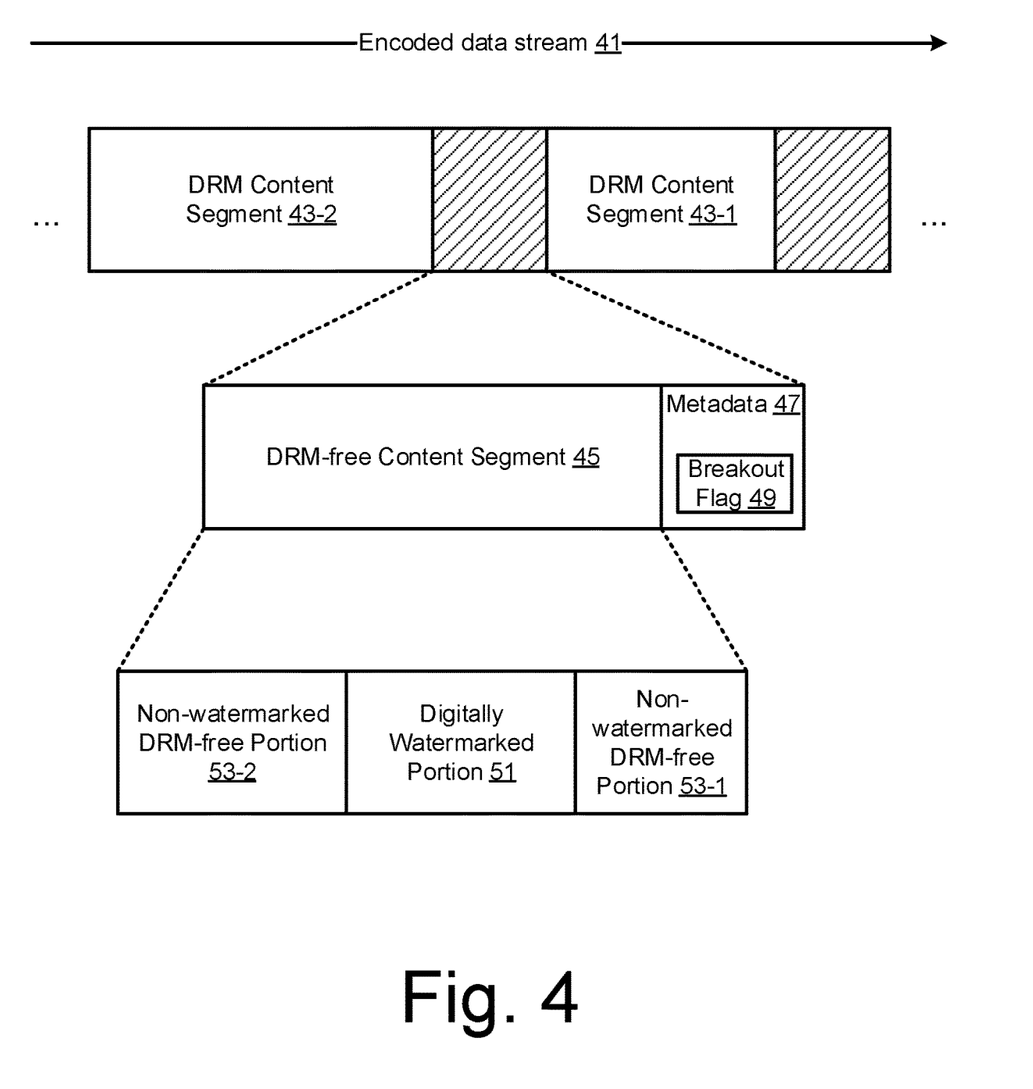
FIG. 4 is a block diagram schematically illustrating an example of an encoded data stream including DRM-protected content segments interleaved with DRM-free segments that are digitally watermarked by the CDN edge node of FIG. 1.

FIGS. 2 and 3 are flow diagrams illustrating a computer-implemented process for digital watermarking by a CDN node, performed by respective components of the content delivery system 1, according to an exemplary embodiment of the present invention. Reference is also made to the block diagram of FIG. 4 schematically illustrating an example of an encoded data stream 41 including DRM-protected content segments 43, interleaved with DRM-free content segments 45 that are digitally watermarked by the CDN edge server 11.

As shown in FIG. 2, the exemplary process begins at step S2-1 where the content server 3 receives or retrieves source data, from a memory, database or remote origin server for example, that is to be delivered to one or more client devices 7 (the intended recipients). The source data includes audio/visual content, such as a media content file, video-on-demand (VOD) assets, a live broadcast stream, or the like. In the present embodiment, the encoder 21 pre-processes the source data that is to be transmitted as an encoded data stream 41 by the streaming controller 17 to the client devices 7. Preferably, although not necessarily, a majority proportion of the source data will be DRM-protected by the content server 3 prior to transmission towards the client devices 7. The encoder 21 determines when or where one or more DRM-free segments 45 are to be inserted to the source data, interleaved between the DRM-protected content data. For example, the encoder 21 may be configured to break a live broadcast stream into a sequence of DRM-protected segments 43, separated by DRM-free segments 45 that are to be digitally watermarked by the CDN 9. In this way, the present embodiments advantageously utilise the CDN's distributed or de-centralized infrastructure for improved scalability and efficiency of recipient-specific digital watermarking.

Preferably, although not necessarily, an initial segment of the encoded data stream 41 to be transmitted should be DRM-protected. Accordingly, at step S2-3, the encoder 21 generates an initial DRM-protected content data segment of the encoded data stream 41, by initiating the application of DRM protection to the source data. In this exemplary embodiment, the encoder 21 begins encryption of the source data using the DRM module 23a. At step S2-5, the content server 3 may be configured to begin transmission of the DRM-protected segment 43 of the encoded data stream 41, towards the client devices 7 using the streaming module 25. For example, in a VOD or live broadcast implementation context, the streaming module 25 may be configured to transmit and/or buffer the output data received from the encoder 21. Alternatively or additionally, the content server 3 may store the DRM-protected content data as an encoded version of the source data, for subsequent distribution to the client devices 7.

At step S2-7, the encoder 21 determines if a DRM-free segment 45 is to be inserted into the encoded data stream 41. Generation and transmission of the current DRM-protected segment 43 of the encoded data stream 41 continues, at step S2-9, until the encoder 21 determines that a DRM-free segment 45 is to be inserted into the encoded data stream 41. In one exemplary embodiment, the content server 3 is configured to insert a DRM-free segment 45 based on determined occurrence of an event associated with the content. For example, the content server 3 may be configured to receive user input identifying one or more events associated with the content. The encoder 21 may determine that a DRM-free segment 45 is to be inserted into the source data in response to user input identifying one of a defined set or type of events. In an exemplary implementation context of a live sports broadcast, the events may be critical match or game moments, such as goal/try scoring events or match points, that are more likely to have to be re-streamed by a pirate and therefore prime segments of the encoded data stream 41 to be digitally watermarked for subsequent source tracking. The DRM-free segment 45 may be a predetermined length or size, such as a ten second portion of the audio/visual content to be transmitted to the client device 7.

In another embodiment, the content server 3 determines that a DRM-free segment 45 is to be inserted to the encoded data stream 41 based on a defined threshold proportion of transmitted media content to be digitally watermarked. For example, the content server 3 may be configured to define a minimum threshold of 10% of the source data to be digitally watermarked before distribution to the client devices 7. In one exemplary implementation, the encoder 21 may be configured to insert at least one DRM-free segment 45 into each group of ten segments of the same length or size. As yet another alternative, a further user input may be received to indicate the end of an event, and consequently the corresponding DRM-free segment 45.

In response to determining at step S2-7 that a DRM-free segment 45 is to be inserted into the encoded data stream 41, the encoder 21 creates a new DRM-free segment 45 at step S2-11. In this embodiment, the encoder 21 adds or inserts metadata 47 to the encoded data stream 41, the metadata 47 including data identifying a DRM-free breakout flag 49. The DRM-free breakout flag 49 indicates that the subsequent segment of the encoded content data stream is not encrypted with any DRM protection. The metadata 47 may be provided as a header portion of the associated DRM-free segment 45 of the encoded data stream 41. At step S2-13, the content server 3 may begin transmission of the DRM-free data segment of the encoded content data stream, towards the client devices 7 using the streaming module 25. Alternatively or additionally, the content server 3 may append the DRM-free data segment to the encoded version of the source data, for subsequent distribution to the client devices 7. After the encoder 21 has completed processing of the DRM-free data segment, the encoder 21 determines at step S2-15 if there is source data remaining to be DRM-protected. If so, processing returns to step S2-3 where the encoder 21 creates the next DRM-protected segment 43 of the encoded data stream 41, by adding metadata 47 to define a new segment containing remaining source data that is encrypted for DRM protection as described above.

Referring to FIG. 3, the exemplary process continues at the CDN 9, where a CDN edge server 11 receives the source data from the content server 3. In the present embodiment, the source data is received as a sequence of segments 43,45 of the encoded data stream 41, at step S3-1. It will be appreciated that the CDN edge server 11 may instead, or additionally, be configured to retrieve a segment 43,45 of a requested encoded data stream 41 from the cache memory 25, via the cache controller 23. At step S3-3, the CDN edge node 11 determines if a DRM-free breakout flag 49 is present in the received metadata 47 of the associated data segment. If not, then the CDN edge node 11 may be configured to forward the received segment 43,45 on to intended recipient client devices 7. It will be appreciated that the CDN edge node 11 may be configured to cache the received segment 43,45 for subsequent distribution to other recipient client devices 7. At step S3-7, the CDN edge node 11 determines if another segment of the encoded data stream 41 has been received, and processing returns to step S3-1 for the next received segment.

On the other hand, when it is determined at step S3-3 that a DRM-free breakout flag 49 is present in the received segment, then the CDN edge node 11 proceeds to use the watermarking module 19 to apply recipient-specific digital watermarking to the received DRM-free data segment. In one exemplary implementation, recipient-specific information is embedded into every image frame of the DRM-free data segment, for example using FFMPEG encoding as known in the art.

In the present embodiment, the watermarking module 19 determines recipient-specific information to be embedded as a digital watermark to the DRM-free segment 45 of a respective encoded data stream 41' for each intended recipient, at step S3-9. At step S3-11, the watermarking module 19 applies the recipient-specific digital watermarking to one or more randomly determined portions 51 within the respective DRM-free data segment for each intended recipient. Advantageously, this provides protection against the possibilities of deriving what portions of a DRM-free segment 45 are digitally watermarked, or deciphering any form of pattern to the CDN-based digital watermarking. In one example implementation, an initial portion 53-1 of the DRM-free segment 45 may be left non-watermarked to offset the portion 51 that is digitally watermarked from the start of the DRM-free segment 45. The initial non-watermarked DRM-free portion 53-1 may have a length or size randomly determined by the watermarking module 19, effectively adding a random padding of the DRM-free data segment before digital watermarking is applied to some or all of the remaining content data in the DRM-free data segment. In another example implementation, the digital watermarking may be applied to a randomly selected plurality of chunks in the DRM-free data segment. Additionally, the watermarking module 19 may further alter a small number of randomly selected pixels of each chunk in the DRM-free data segment, thereby changing the calculated checksum value of each chunk as commonly included in the associated metadata 47. Advantageously, this further decreases the possibility of deriving the watermarked chunks based on comparison of chunks across multiple intercepted data streams, since each watermarked chunk (as well as any non-watermarked chunks, for example from the random padding) will be different.

At step S3-13, the CDN edge server 11 transmits the respective recipient-specific encoded data stream 41', including the DRM-protected segments 43 and the recipient-specific digitally watermarked DRM-free segments 45', to the client device 7. Advantageously, CDN server computational resources requirements are greatly reduced, since decryption and re-encryption of the content data is not required in order to apply digital watermarking at the CDN, nor the additional computational overhead for license/key sharing in the CDN 9. In this way, embodiments address the technical problem of scalability of individualised watermarking, particularly in the implementation content of live encoding of significant parallel streams. Moreover, in embodiments where only a segment of content in the DRM-free segment is watermarked, the associated damage and cost of such content leaking can be minimised. For example, in the live media broadcast implementation context where there is no option to perform offline transcoding with a watermark, the resulting DRM-free segments may be easy to share. However, these shared segments alone may have no real value when the system is configured to insert a DRM-free breakout for a maximum of 10%, for example, of the associated event. So, end users in the system will still need to pay for and obtain a DRM license to decode and play the received content, since re-sharing the DRM-free chunks between themselves will have minimal, or no, value.

Example Computer System Implementation

Figure 5:
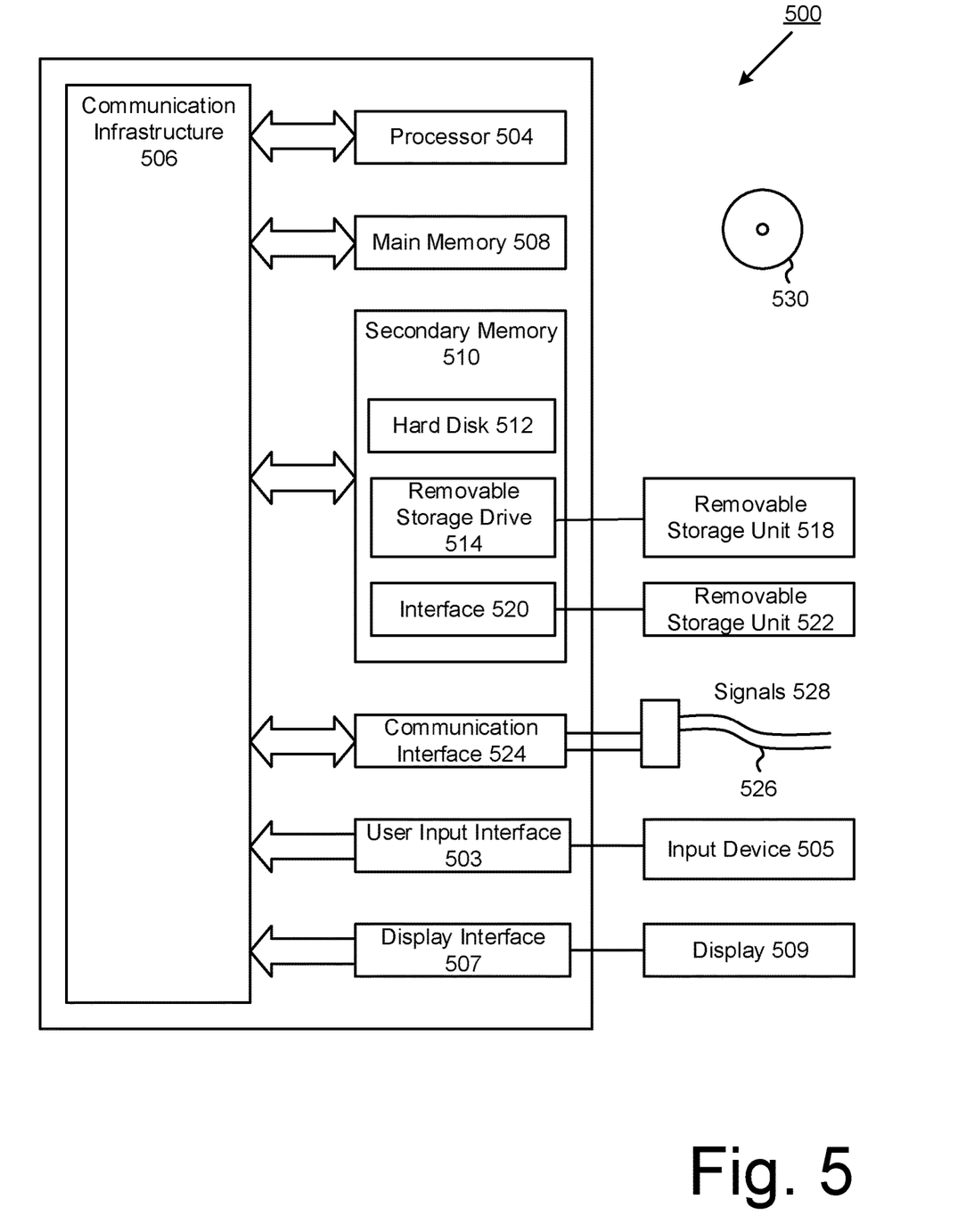
FIG. 5 is a diagram of an example of a computer system on which one or more of the functions of the embodiments may be implemented.

FIG. 5 illustrates an example computer system 500 in which the present invention, or portions thereof, can be implemented as computer-readable code to program processing components of the computer system 500. Various embodiments of the invention are described in terms of this example computer system 500. For example, the content server 3, CDN edge servers 11, and client devices 7 of FIG. 1 can each be implemented in a respective system 500. The methods illustrated by the flowcharts of FIGS. 2 and 3 can also be implemented in a respective system 500. After reading this description, it will become apparent to a person skilled in the relevant art how to implement the invention using other computer systems and/or computer architectures.

Computer system 500 includes one or more processors, such as processor 504. Processor 504 can be a special purpose or a general-purpose processor. Processor 504 is connected to a communication infrastructure 506 (for example, a bus, or network). Computer system 500 also includes a user input interface 503 connected to one or more input device(s) 505 and a display interface 507 connected to one or more display(s) 509, which may be integrated input and display components. Input devices 505 may include, for example, a pointing device such as a mouse or touchpad, a keyboard, a touchscreen such as a resistive or capacitive touchscreen, etc. According to an embodiment, computer display 530, in conjunction with display interface 502, can be used to display UI 115 on operator console 110.

Computer system 500 also includes a main memory 508, preferably random access memory (RAM), and may also include a secondary memory 510. Secondary memory 510 may include, for example, a hard disk drive 512, a removable storage drive 514, flash memory, a memory stick, and/or any similar non-volatile storage mechanism. Removable storage drive 514 may comprise a floppy disk drive, a magnetic tape drive, an optical disk drive, a flash memory, or the like. The removable storage drive 514 reads from and/or writes to a removable storage unit 518 in a well-known manner. Removable storage unit 518 may comprise a floppy disk, magnetic tape, optical disk, etc. which is read by and written to by removable storage drive 514. As will be appreciated by persons skilled in the relevant art(s), removable storage unit 518 includes a non-transitory computer usable storage medium having stored therein computer software and/or data.

In alternative implementations, secondary memory 510 may include other similar means for allowing computer programs or other instructions to be loaded into computer system 500. Such means may include, for example, a removable storage unit 522 and an interface 520. Examples of such means may include a program cartridge and cartridge interface (such as that found in video game devices), a removable memory chip (such as an EPROM, or PROM) and associated socket, and other removable storage units 522 and interfaces 520 which allow software and data to be transferred from the removable storage unit 522 to computer system 500.

Computer system 500 may also include a communications interface 524 implemented for example at the operating system level to allow data to be transferred between computer system 500 and external devices, for example as signals 528 over a communication channel 526. Communications interface 524 may include a modem, a network interface (such as an Ethernet card), a communications port, a PCMCIA slot and card, or the like.

Various aspects of the present invention can be implemented by software and/or firmware (also called computer programs, instructions or computer control logic) to program programmable hardware, or hardware including special-purpose hardwired circuits such as application-specific integrated circuits (ASICs), programmable logic devices (PLDs), field-programmable gate arrays (FPGAs), etc. of the computer system 500, or a combination thereof. Computer programs for use in implementing the techniques introduced here may be stored on a machine-readable storage medium and may be executed by one or more general-purpose or special-purpose programmable microprocessors. The terms "computer program medium", "non-transitory computer readable medium" and "computer usable medium" introduced herein can generally refer to media such as removable storage unit 518, removable storage unit 522, and a hard disk installed in hard disk drive 512. Computer program medium, computer readable storage medium, and computer usable medium can also refer to memories, such as main memory 508 and secondary memory 510, which can be memory semiconductors (e.g. DRAMs, etc.). These computer program products are means for providing software to computer system 500.

Computer programs are stored in main memory 508 and/or secondary memory 510. Computer programs may also be received via communications interface 524. Such computer programs, when executed, enable computer system 500 to implement the present invention as described herein. In particular, the computer programs, when executed, enable processor 504 to implement the processes of embodiments of the present invention as described above. Accordingly, such computer programs represent controllers of the computer system 500. Where the invention is implemented using software, the software may be stored in a computer program product and loaded into computer system 500 using removable storage drive 514, interface 520, hard drive 512, or communications interface 524.

Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nano-technological storage device, etc.), and communication mediums (e.g., wired and wireless communications networks, local area networks, wide area networks, intranets, etc.).

Alternative Embodiments

It will be understood that embodiments of the present invention are described herein by way of example only, and that various changes and modifications may be made without departing from the scope of the invention.

For example, aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method of digital watermarking at a content distribution network (CDN) node, the method comprising:
   receiving, from an origin server, source data intended for at least one recipient, the source data including a plurality of encrypted segments interleaved with at least one non-encrypted segment;
   detecting metadata in the source data, the metadata identifying the, or each, non-encrypted segment;
   in response to detecting metadata identifying a non-encrypted segment, modifying the source data for the, or each, recipient, by embedding a recipient-specific digital watermark to at least a portion of a non-encrypted segment in the source data; and
   transmitting the modified source data to the, or each respective, recipient.

2. The method of claim 1, wherein the recipient-specific digital watermark is embedded to at least a portion of each non-encrypted segment in the source data.

3. The method of claim 1, wherein the recipient-specific digital watermark is embedded to one or more randomly determined portions within a non-encrypted segment.

4. The method of claim 3, wherein the recipient-specific digital watermark is embedded to a portion of the non-encrypted segment at a random offset from the start of the non-encrypted segment.

5. The method of claim 1, wherein the source data comprises an encoded data stream of on-demand or live media content.

6. The method of claim 5, wherein the encoded data stream includes metadata identifying a non-encrypted segment that is added when the origin server creates a non-encrypted segment.

7. The method of claim 6, wherein the origin server creates a non-encrypted segment in response to determined occurrence of an event associated with the source data.

8. The method of claim 7, wherein occurrence of an event is determined based on at least one parameter defining a proportion of the encoded data stream to be digitally watermarked.

9. The method of claim 7, wherein occurrence of an event is determined from user input identifying the associated event.

10. The method of claim 1, wherein the, or each, non-encrypted segment is a predetermined length or size.

11. The method of claim 1, wherein the encrypted segments comprise source data that is encrypted for digital rights management.

12. The method of claim 1, wherein the CDN node comprises an edge server in a distributed network.

13. The method of claim 12, wherein the received source data is stored in a cache memory, and wherein the recipient-specific digital watermark is embedded to a non-encrypted segment of the source data retrieved from the cache memory.

14. The method of claim 1, wherein the recipient-specific digital watermark comprises information that is unique to a device of the, or each, intended recipient.

15. A non-transitory storage medium comprising machine readable instructions stored thereon for causing a computer system to:
- receive, from an origin server, source data intended for at least one recipient, the source data including a plurality of encrypted segments interleaved with at least one non-encrypted segment;
- detect metadata in the source data, the metadata identifying the, or each, non-encrypted segment;
- in response to detecting metadata identifying a non-encrypted segment, modify the source data for the, or each, recipient, by embedding a recipient-specific digital watermark to at least a portion of a non-encrypted segment in the source data; and
- transmit the modified source data to the, or each respective, recipient.

* * * * *